May 20, 1924.
A. W. DUNN ET AL
UNIVERSAL JOINT
Original Filed Oct. 24, 1921   3 Sheets-Sheet 1
1,494,465
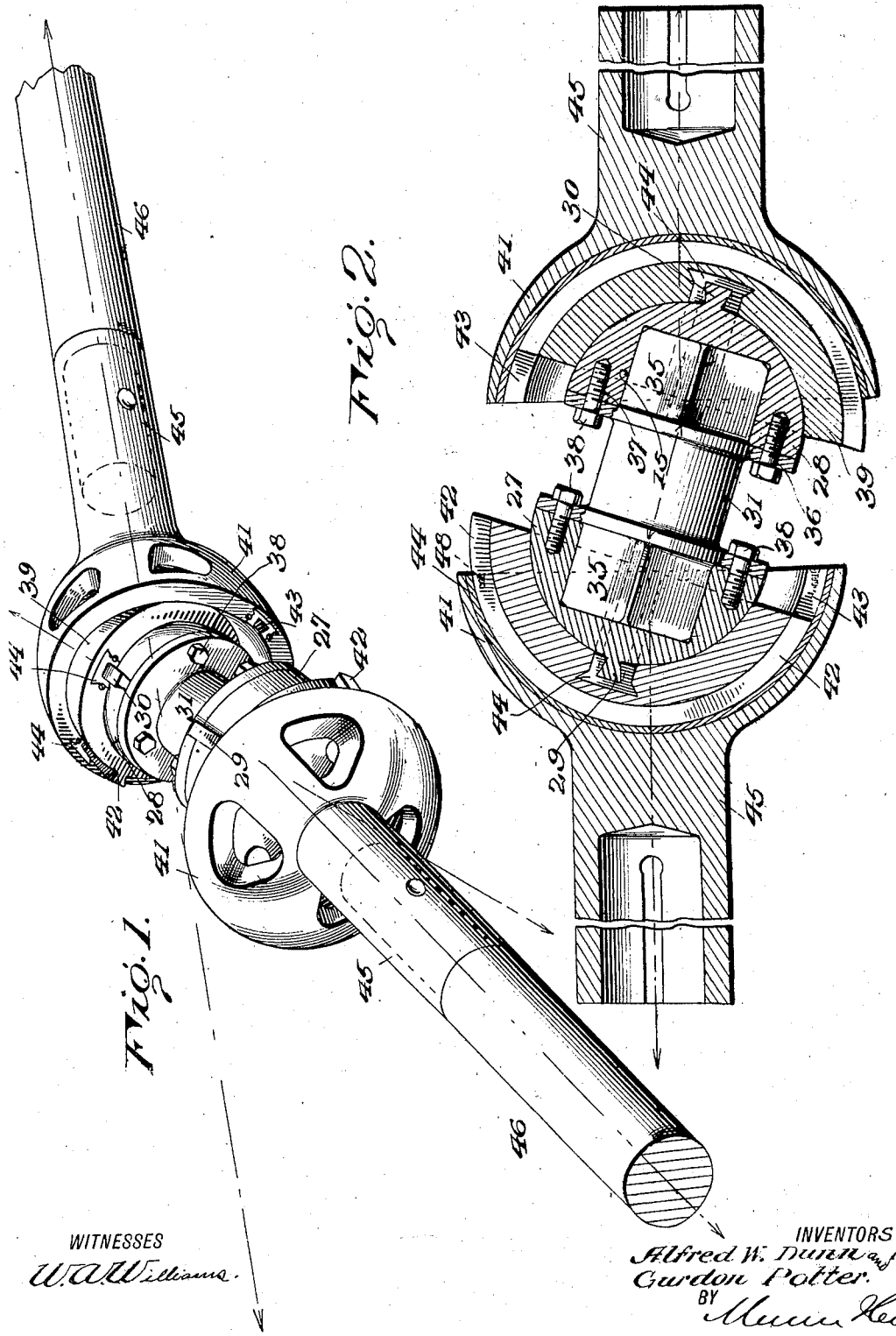
WITNESSES
INVENTORS
Alfred W. Dunn
Gordon Potter
BY
ATTORNEYS

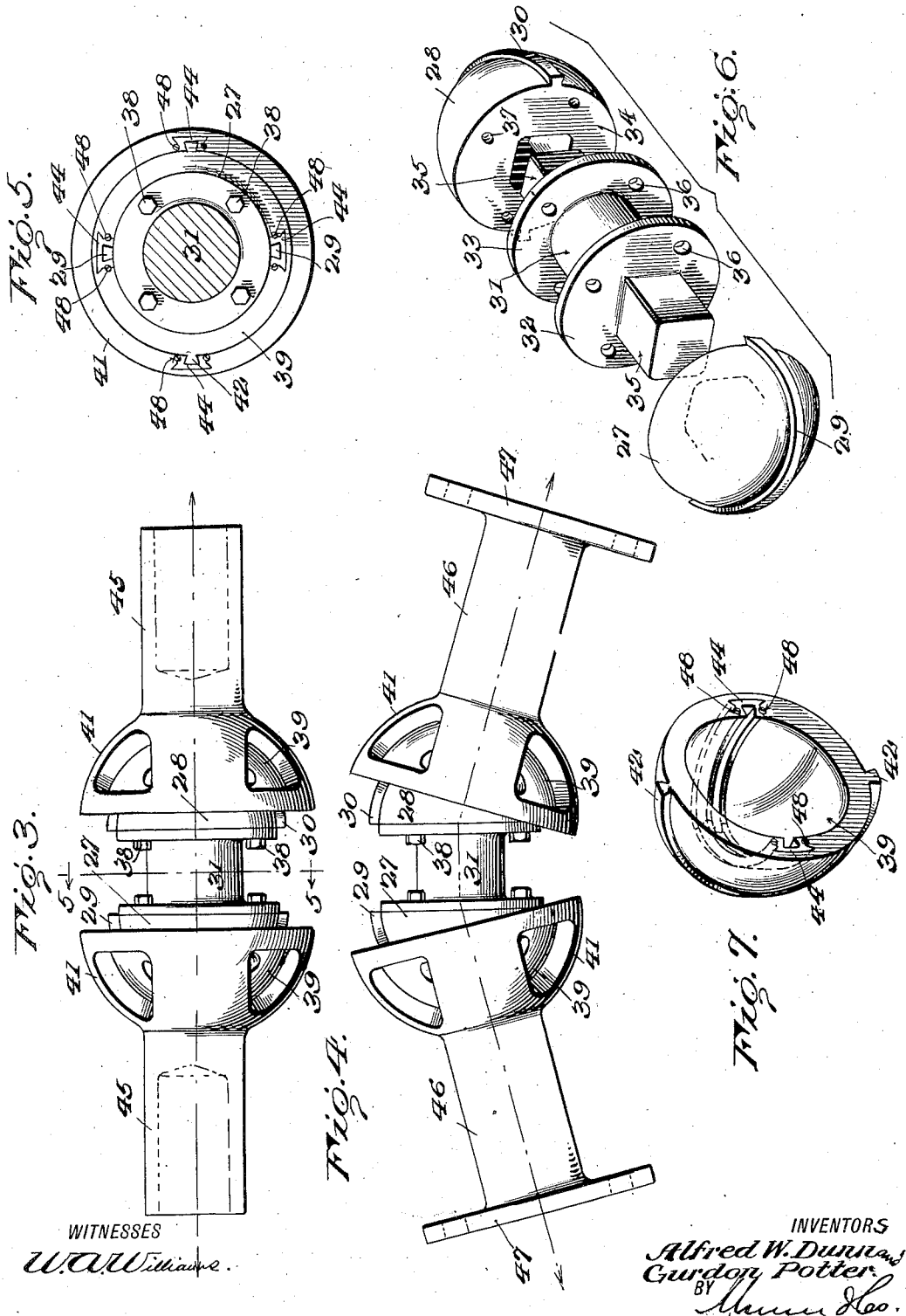

May 20, 1924.

A. W. DUNN ET AL

UNIVERSAL JOINT

Original Filed Oct. 24, 1921    3 Sheets-Sheet 3

WITNESSES
W. A. Williams.

INVENTORS
Alfred W. Dunn and
Gurdon Potter.
BY
Munn & Co.
ATTORNEYS

UNITED STATES PATENT OFFICE.

ALFRED W. DUNN, OF HONOMU, TERRITORY OF HAWAII, AND GURDON POTTER, OF SAN FRANCISCO, CALIFORNIA.

UNIVERSAL JOINT.

Application filed October 24, 1921, Serial No. 510,111. Renewed April 4, 1924.

*To all whom it may concern:*

Be it known that we, ALFRED W. DUNN and GURDON POTTER, citizens of the United States, and residents, respectively, of Honomu, Hawaii, Territory of Hawaii, and San Francisco, in the county of San Francisco and State of California, have invented certain new and useful Improvements in Universal Joints, of which the following is a specification.

Our present invention relates generally to universal joints and more particularly to a form and construction of joint which will lend itself to ready duplication and permit of the completion of a driving connection between shaft sections whose axes are offset with respect to one another.

A further object is the provision of a universal joint structure which will permit of maximum deflection in the angles of connected shaft sections, as well as one providing for ready assembly and disassembly and for quick easy renewal of certain parts subject in use to maximum wear as compared to the other parts.

More particularly our invention aims to provide a universal joint which includes coacting relatively movable and self-retaining joint forming members, avoiding the necessity of other connecting parts and thus permitting of ready duplication in constructing a double joint which will not only greatly increase the range of deflection possible between angular shaft sections but will also admit of driving through shaft sections whose axes are offset with respect to one another.

Figure 8:
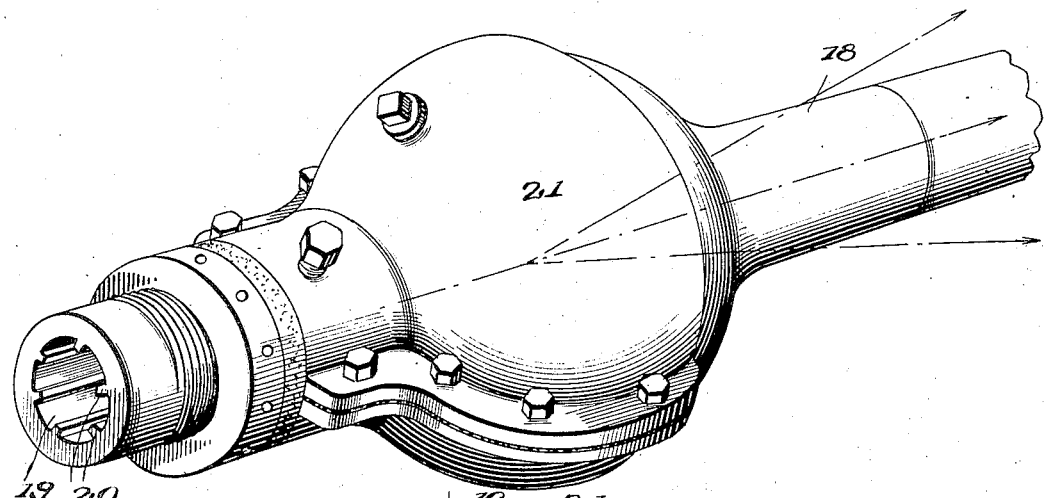
Figure 9:
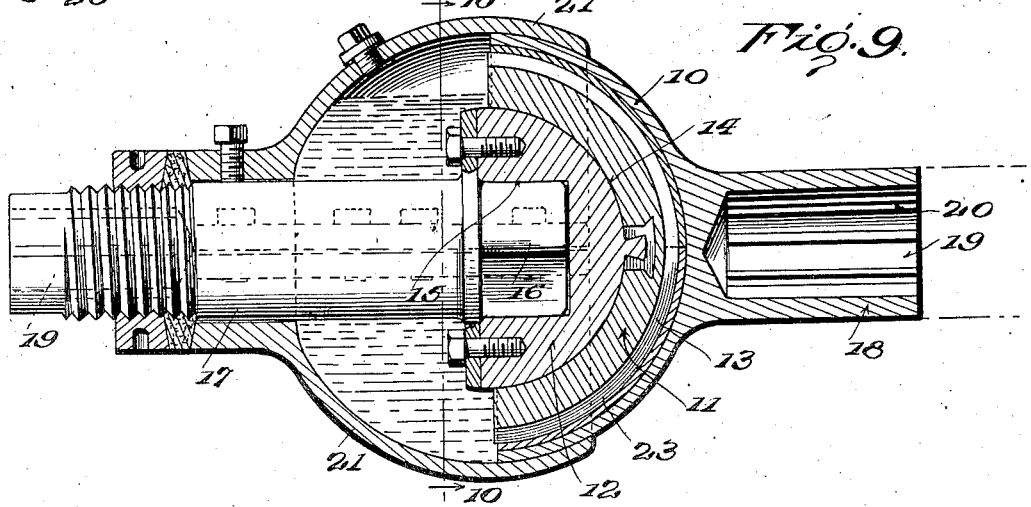
Figure 10:
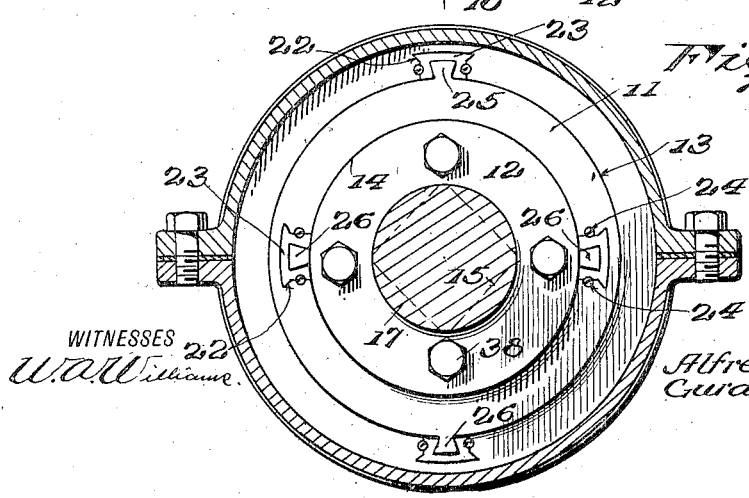

With these objects in mind the following description will be better understood with respect to the accompanying drawings, the latter of which form a part of this specification and include several figures of which, Figure 1 is a perspective view of the complete double universal joint between angularly disposed shaft sections, Figure 2 is a longitudinal section showing the offset possibilities of the joint, Figure 3 is a side view of the joint shown in Figure 2, Figure 4 is a side view showing a slight modification, Figure 5 is a central cross section taken on line 5—5 of Figure 3, Figure 6 is a detail perspective view of the inner members of the double joint and the connection therebetween, in detached relation, Figure 7 is a detail perspective view of one of the inner shells, Figure 8 is a perspective view of a single enclosed joint embodying our invention, Figure 9 is a central longitudinal section therethrough, and Figure 10 is a transverse section taken on line 10—10 of Figure 9.

Referring now to these figures and particularly to Figures 8, 9 and 10 wherein we have shown the single form of joint, attention is called to the three essential parts of the joint, namely the outer member 10, the intermediate member 11 and the inner member 12. Of these parts, the outer member 10 is in the form of a shell having a concave socket 13 which the outer surface of the intermediate member 11 also of shell-like form movably interfits. This intermediate part 11 which constitutes the inner shell of the joint is likewise provided with a concave socket 14 which the surface of the inner ball member 12 movably interfits, the latter being for instance of the hemispherical form shown particularly in Figure 9, with a squared or polygonal bore 15 to receive the squared or polygonal end 16 of one stem 17 of the joint, the other stem 18 of which may be integral as shown with the outer shell 10.

In this single joint form of the invention as shown in Figures 8, 9 and 10, intended for instance as the universal joint for the propeller shafts of automobiles, the stems 17 and 18 may have bores 19 with internal ribs 20 or may be otherwise formed for the usual splined connections with sections of a propeller shaft. Moreover as applied in this use the external surface of the outer shell 10 is preferably in the form of the segment of a sphere in order to coact with a similar shaped cover 21 in connected sections as in Figure 8, secured in the stem 17, so that provision is made for the retention of oil or grease in the joint as is quite common.

By reference to and comparison of Figures 9 and 10 it will be noted that the outer shell 10 and the inner shell 11 have their inner surfaces provided with grooves 22 and 23 at right angles to one another, these grooves extending along the walls of their concave sockets and of either cylindrical, T-shaped or dovetailed form as shown to receive and retain similarly formed and segmentally curved retaining strips 24, the latter of which by virtue of their sectional form are capable of ready renewal and may be secured in place by wedge screws 24$^a$ in order to receive in their retaining grooves ribs 25 and 26 externally along the inner shell 11 and the inner or ball member 12.

It is quite obvious from the foregoing that in so far as the two shells are concerned, the inner shell 11 and the inner ball member 12 have bearing along practically their entire outer surfaces and that for this reason as well as the self-retention of the external ribs of the inner shell and the inner ball member caused by the shaping of these ribs to conform to suitably undercut walls of the grooves in which they work, the two shells may be materially less than hemispheres irrespective of the particular shape of the inner ball member in adapting the joint to more or less angular deflection.

It is furthermore obvious that needing no other than their own support for their retention, the several members of the joint we propose lend themselves to ready duplication in the formation of a double joint whose object is to allow of much greater angular deflection than that to which a single joint is applicable, as well as to permit of an effective driving connection between shaft sections whose axes are offset with respect to one another.

This great advantage to which our invention is susceptible is well illustrated in Figures 1 to 7 inclusive and referring to Figure 6 in particular it will be noted that the two ball members 27 and 28, with their external dovetailed ribs 29 and 30 in the same plane, are adapted to be connected by a cylindrical or other connecting member 31 having annular flanges 32 and 33 to abut the inner flat faces 34 of the ball members and having squared or polygonal extensions 35 beyond the flanges to enter conformably shaped axial bores in the ball members. This form of connection permits each of the ball members to be properly associated in its respective section of the joint and the subsequent application of the connecting member 31 with both ball members by bolts extending through apertures 36 in the flanges 32 and 33 and into bolt receiving apertures 37 of the ball members, it being obvious that the polygonal extensions 35 of the connecting member within the polygonal bores of the ball members will take all strain of the torque through the joint from the connecting bolts so utilized.

In Figures 1 and 2 we have shown the two ball members as thus connected by bolts 38 to the connecting member 31 therebetween, disposed within inner shells 39, in the grooves 40 of which the ribs 29 and 30 are slidable.

These inner shells 39 are in turn movable in the sockets of the outer shells 41 by virtue of the external ribs 42 of the inner shells disposed within the grooves 43 of the outer shells at right angles to the ribs of the ball members and the grooves of the inner shells. We have also shown in these figures the use of the segmentally grooved retaining strips 44 in the outer and inner shells, locked as previously described in connection with the strips 24 so that these parts may be readily renewed.

Figure 1 illustrates the two extending stems 45 axially bored to receive and operate in connection with angular shafts 46, while Figure 2 shows the joint disposed with the stems 45 in axially offset relation and for connection to shaft sections in similarly offset relation although it is quite obvious that the invention does not depend in either structure or action upon any particular manner of connecting the stems to shaft sections. The joint otherwise constructed as just above described may have stems 47 as shown in Figure 4 with flanged ends 47$^a$ for connection with shaft sections and the like and, while other means may with possibly equal facility be utilized to removably secure the retaining strips 44 in place, we prefer the wedge screws 48 as shown in Figure 7 where the method of disposition of these retaining strips within one of the inner shells 39 is most plainly to be seen.

It is thus to be observed that by virtue of its ready extension to a double joint form and the obvious advantages of a joint of this form our invention is particularly to be desired in the coupling of shafts with the object in view of avoiding multiplicity of gears, its range of use is especially wide as compared to other joints for a similar purpose, it is capable of being readily maintained in properly working condition, is subject to minimum wear in action and is readily renewable as to such parts that do wear.

We claim:

1. A universal joint consisting of inner and outer shells, each having a concave socket, the inner shell interfitting the socket of the outer shell, and an inner ball member interfitting the inner shell, said outer and inner shells having inner grooves at right angles to one another, provided with undercut side walls, segmentally curved strips, each in endwise abutting sections, interfitting and secured within the grooves of the inner and outer shells and also provided with grooves having undercut side walls, and external ribs carried by the inner shell and the ball member conforming in shape to and slidably interfitting the grooves of the said grooved strips of the outer and inner shells whereby the parts will be self-retaining, and wedge screws disposed in the edges of the inner and outer shells at the opposite ends of said grooved strips to removably hold the latter in place.

2. A universal joint consisting of inner and outer shells, each having a concave socket, said inner shell interfitting the socket of the outer shell, a stem connected to the outer shell, an inner ball member interfitting the inner shell and having a polygonal bore, said inner and outer shells and said inner shell and the ball member having relatively engaging and self-retaining ribs and grooves, and a stem having a flange connected to the ball member and having a polgonal extension projecting beyond the flange and into the bore of the ball member.

3. A double universal joint consisting of oppositely disposed and opening inner and outer shells, each inner shell interfitting an outer shell, a pair of oppositely facing ball members interfitting the inner shells and having opposed flat faces, said inner and outer shells and said ball members having relatively engaging ribs and grooves retaining each ball member and its inner shell in movable relation within the respective outer shell, and a connecting member between the two ball members having flanges secured to the opposing faces of the ball members.

4. A double universal joint consisting of oppositely disposed and opening inner and outer shells, each inner shell interfitting an outer shell, a pair of oppositely facing ball members interfitting the inner shells and having opposed flat faces, said inner and outer shells and said ball members having relatively engaging ribs and grooves retaining each ball member and its inner shell in movable relation within the respective outer shell, and a connecting member between the two ball members having flanges secured to the opposing faces of the ball members, said ball members having polygonal grooves, and said connecting member having polygonal extensions projecting beyond its flanges and into the bores of the said ball members.

ALFRED W. DUNN.
GURDON POTTER.